Dec. 7, 1948.  J. S. WEBB  2,455,840
TREE-FELLING SAW ATTACHMENT FOR TRACTORS
Filed Nov. 3, 1944  3 Sheets-Sheet 1

Inventor
J. S. Webb
By Kimmel & Crowell
Attorneys

Dec. 7, 1948. J. S. WEBB 2,455,840
TREE-FELLING SAW ATTACHMENT FOR TRACTORS
Filed Nov. 3, 1944 3 Sheets-Sheet 2
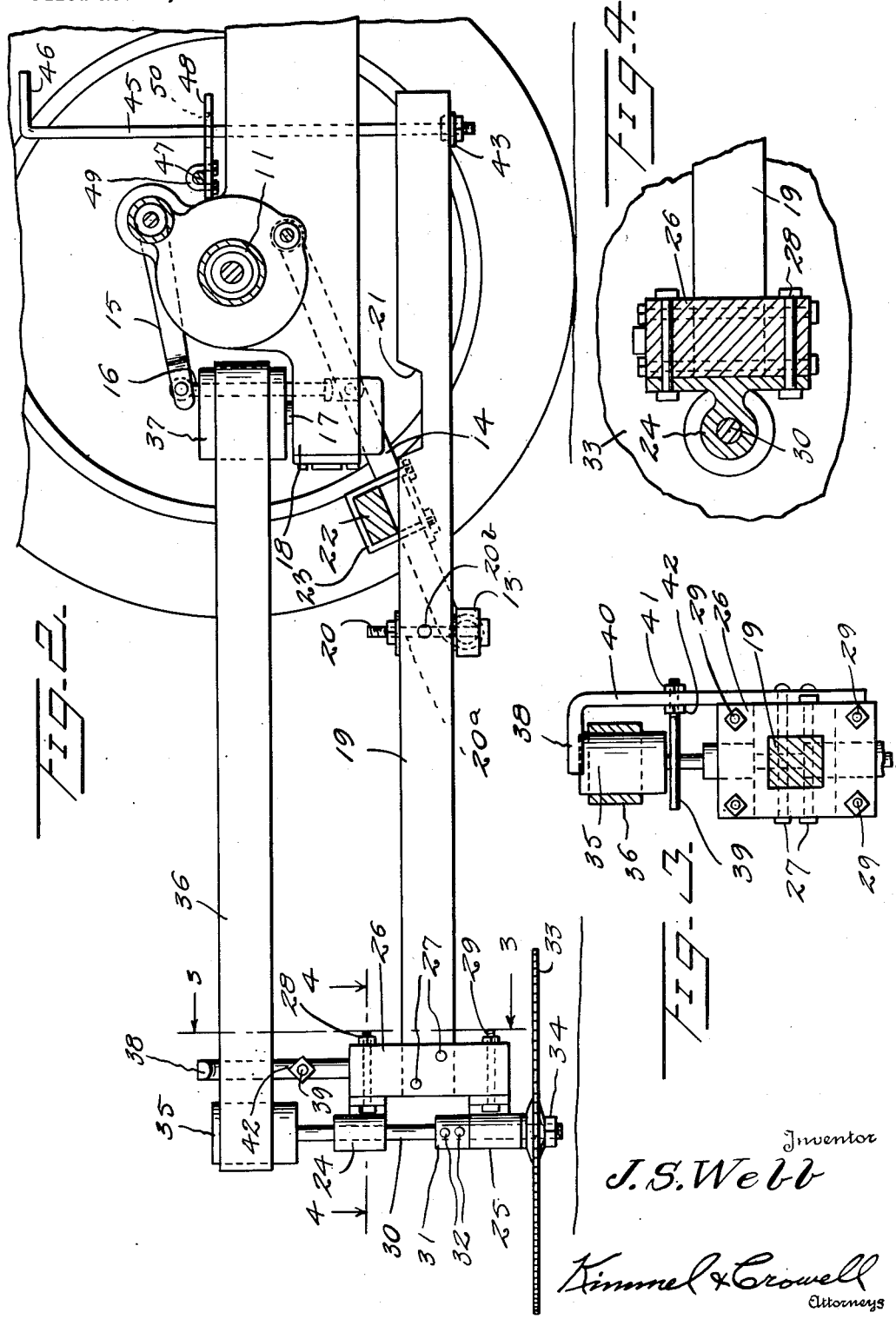
Inventor
J. S. Webb
Kimmel & Crowell
Attorneys

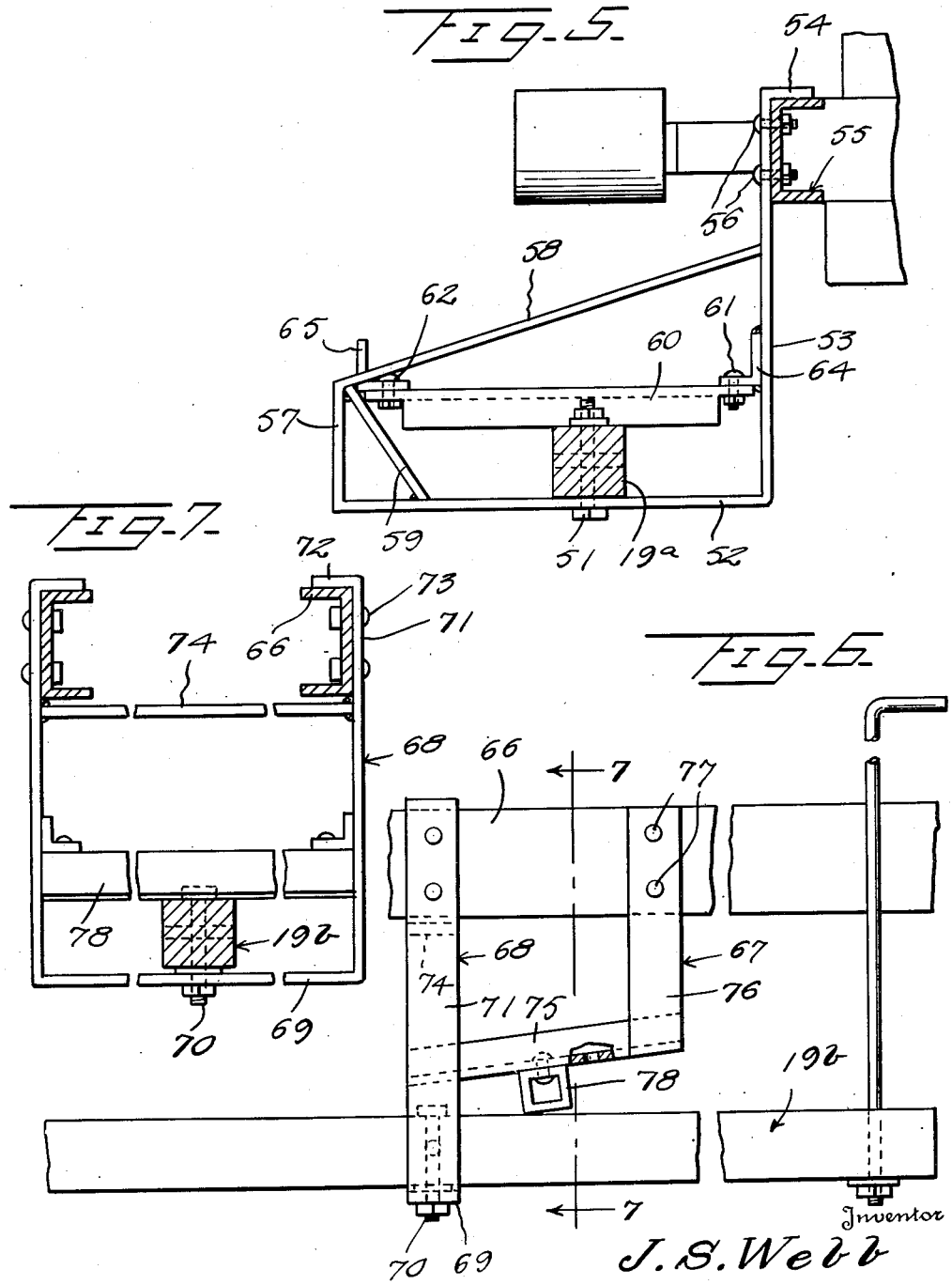

Patented Dec. 7, 1948

2,455,840

UNITED STATES PATENT OFFICE 2,455,840

TREE-FELLING SAW ATTACHMENT FOR TRACTORS

James Stewart Webb, Demopolis, Ala.

Application November 3, 1944, Serial No. 561,710

1 Claim. (Cl. 143—43)

This invention relates to saw attachments for a tractor for cutting trees or the like.

An object of this invention is to provide a simple attachment whereby a disk or circular saw may be supported from either the rear or front end of a tractor and the saw moved into engagement with a tree at a point close to the ground so that the tree stump will be very small.

Another object of this invention is to provide an attachment of this kind which is simple in construction, and can be mounted on tractors of different types.

A further object of this invention is to provide an attachment of this kind which can be mounted on a tractor without changing any of the present parts of the tractor, and can be mounted or dismounted very quickly.

With the foregoing objects in view, and others which may hereinafter more fully appear, the invention consists of the novel construction, combination and arrangement of parts as will be more specifically referred to and illustrated in the accompanying drawings wherein are shown embodiments of the invention; but it is to be understood that changes, modifications and variations may be resorted to which fall within the scope of the invention as claimed.

In the drawings:

Figure 2 is a sectional view taken on the line 2—2 of Figure 1.

Figure 3 is a sectional view taken on the line 3—3 of Figure 2.

Figure 4 is a sectional view taken on the line 4—4 of Figure 2.

Figure 5 is a detail front elevation, partly broken away and in section, of a modified form of attachment for mounting on the front end of a tractor.

Figure 6 is a detail side elevation, partly broken away, showing a further modification for mounting on the front end of a tractor.

Figure 7 is a sectional view taken on the line 7—7 of Figure 6.

Figure 1:
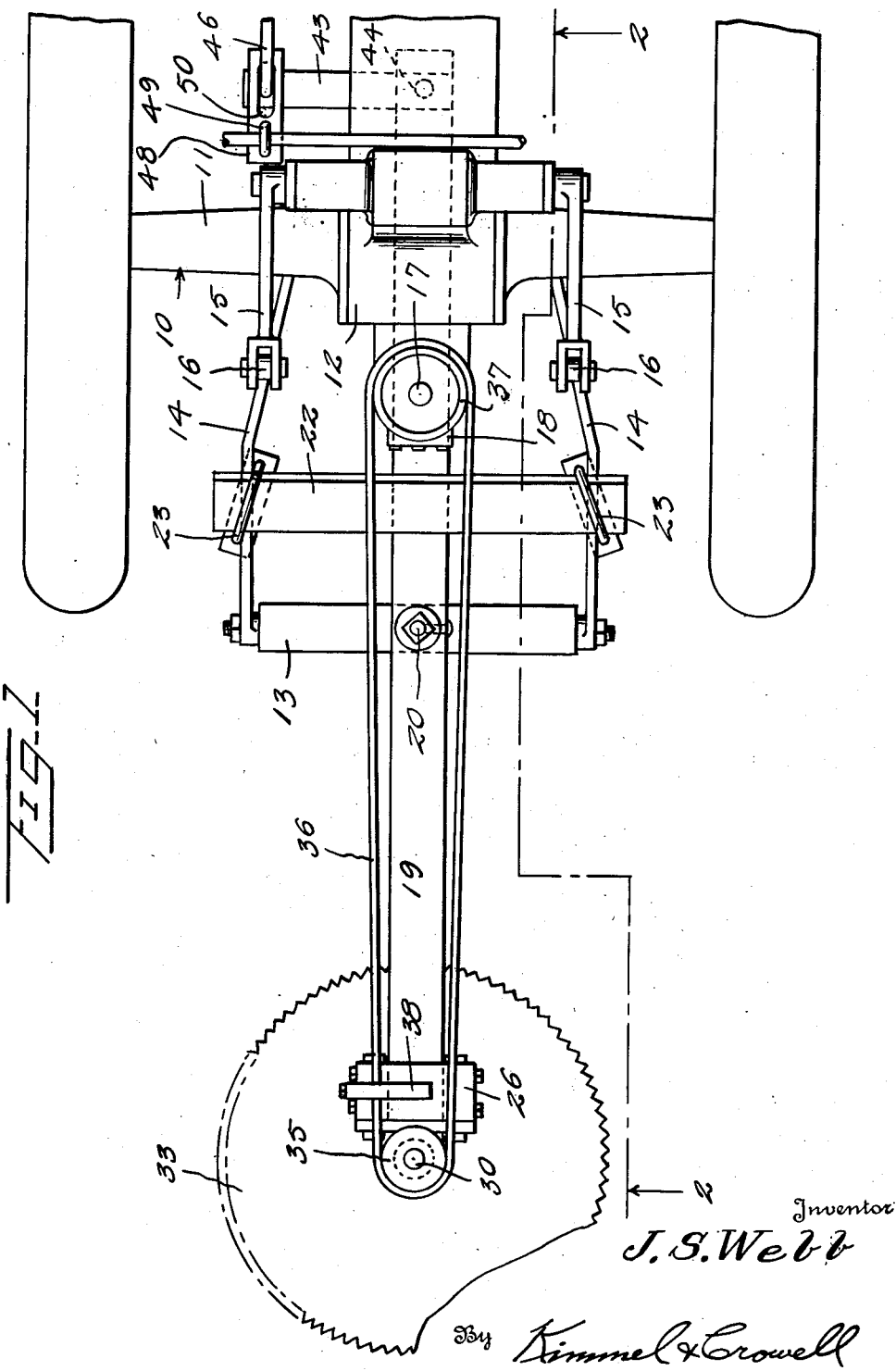
Figure 1 is a fragmentary top plan view of a tractor having a saw attachment thereon constructed according to an embodiment of this invention.

Referring to the drawings and first to Figures 1 to 4 inclusive, the numeral 10 designates generally a tractor and the numeral 11 designates the rear axle housing which is connected to a differential 12. A rearwardly disposed draw bar 13 is carried by a pair of downwardly inclined rockable supporting arms 14, which may be elevated or lowered through rocking of levers 15 which are connected to levers 14 by links 16.

The tractor also includes a power takeoff shaft 17 connected with a power takeoff structure 18 forming part of the present structure of the tractor.

An elongated saw supporting beam 19 is disposed in substantially a horizontal position, and is secured at an intermediate point to a pivot member 20 extending through the draw bar 13. The beam 19 engages on the upper side of draw bar 13, and has a portion thereof extending rearwardly of draw bar 13, and another portion thereof extending forwardly therefrom. The upper side of the beam 19 is formed with a cutout 21 beneath the takeoff structure 18 so that beam 19 may be elevated for the desired distance.

The beam 19 is held against downward tilting at its rear end by means of a transversely disposed bar 22 which is secured at the opposite ends thereof to the draw bar supporting arms or levers 14 by a pair of U-bolts 23. The bar 22 engages a beam 19 at a point forwardly from draw bar 13 and engages beam 19 on the upper side thereof, as shown in Figure 2.

The beam 19, at its rear end, has secured thereto upper and lower bearings 24 and 25 which are secured to a head structure 26 fixed by fastening members 27 to the rear end of beam 19. Bearings 24 and 25 are secured to head structure 26 by means of fastening members 28 and 29 respectively. A vertically disposed shaft 30 is journalled through bearings 24 and 25 and is held against downward movement by means of a collar 31 engaging against the upper side of bearing 25 and secured to shaft 30 by fastening members 32.

A circular or disk saw 33 is secured by means of a nut or fastening member 34 to the lower end of shaft 30, and is normally disposed in a substantially horizontal position at a point above the ground level. The height of saw 33 from the ground is determined by raising or lowering the draw bar supporting arm or levers 14. The shaft 30, at its upper end, has secured thereto, a pulley 35 about which a belt 36 engages. Takeoff shaft 17 has secured thereto a driving pulley 37 about which belt 36 engages so that rotation of pulley 37 will rotate pulley 35 and saw 33. Belt 36 is held against undue upward or downward movement with respect to pulley 35 by means of a pair of guard arms 38 and 39. The arms 38 and 39 are disposed at the upper and lower edges of belt 36 respectively, arm 38 being formed with a vertical supporting member or bar 40 which is adapted to be secured in any suitable manner to head 26. Arm 39 is in the form of an elongated bar which is threaded at one end and extended through supporting bar 40 and locked by means of nuts 41 and 42.

The forward end of beam 19 has secured thereto a lateral extending bar 43 which is secured to beam 19 by one or more fastening members 44. Bar 43 has fixed thereto a vertically disposed lever or beam operating member 45 terminating at its upper end in a right angularly disposed handle 46.

The tractor 10 also includes a transversely extended horizontal brake rod 47 and operating member 45 is steadied by means of a guide bar 48 secured to brake rod 47 by a U-bolt 49. Bar 48 may be formed with a relatively large opening 50 through which operating member 45 loosely engages and preferably fastening member 49 is slidable along the brake rod 47 so that operating member 45 may be swung lengthwise of brake member 47.

Referring now to Figure 5 there is disclosed a modified form of saw beam support where the power takeoff of the tractor extends from one side of the frame. The beam 19a is similar to the beam 19, and has secured to its outer end a saw and saw shaft, similar to the structure shown in Figures 1 to 4. The beam 19 is swingably mounted on a pivot member 51, which extends through a horizontally disposed bar 52. Bar 52 is secured to or formed integral with a vertical supporting bar 53 which has a right angular upper end portion 54 engaging over the upper side of the tractor frame 55. The upper portion of supporting bar 53 is secured to the outer side of frame member 55 by fastening members 56. The outer end of horizontal bar 52 is formed with a short vertical extension 57 and an upwardly and inwardly inclined bracing bar 58 extends from the upper end of extension 57 and is secured as by welding or other fastening means 58 to the outer side of vertical supporting bar 53.

An angled bracing bar 59 is secured between the outer portion of horizontal bar 52 and the angle formed between extension 57 and bracing member 58. A horizontally disposed bar 60 extends over the upper side of beam 19a rearwardly of pivot 51 and is secured to the supporting frame structure hereinbefore described by means of fastening members 61 and 62 which engage through angled bar supporting members 64 and 65 respectively.

Angled supporting member 64 is secured, as by welding or the like, to supporting bars 53 and extends rearwardly therefrom and angled supporting member 65 is secured to the outer portion of bracing member 58 and may also be welded to bracing member 59.

The frame structure hereinbefore described, is of a width to engage between the frame member 55 and the adjacent wheel of the tractor.

Referring now to Figures 6 and 7 there is disclosed a beam supporting means whereby the saw beam may be supported from the front end of the tractor.

The frame 66 of the tractor has secured thereto a beam supporting frame structure, generally designated as 67. The frame structure 67 includes a U-shaped beam supporting member 68 having the bight 69 thereof lowermost on which beam 19b is pivotally mounted by means of a pivot member 70. The upper ends of the parallel legs 71 of the U-shaped member 68, are formed with inwardly projecting extensions 72 engaging over the upper sides of the frame members 66 and the parallel vertical legs 71 are secured to frame members 66 by fastening members 73. A transversely disposed horizontal bracing bar 74 extends between the parallel legs 71, at a point slightly below the frame members 66, and has the opposite ends thereof welded or otherwise firmly secured to the legs 71. A pair of rearwardly extending and upwardly inclined angle members 75 are welded or otherwise fixed at their lower forward ends to the vertical legs 71 of U-shaped members 68, and the rear ends of angle members 75 have secured thereto vertical bars 76 which are secured by fastening members 77 to the frame members 66 rearwardly of U-shaped members 68. A tubular member 78 is fixed between angle members 75 intermediate U-shaped members 68 and supporting bars 76 and engages the upper side of beam 19b rearwardly of pivot 70. In other respects the structure shown in Figures 6 and 7 is identical with the structure shown in Figures 1 to 4 inclusive.

In the use and operation of this attachment beam 19 is pivotally mounted on pivot 20 engaging through draw bar 13, and is held in a substantially horizontal position by transverse bar 22. When power takeoff shaft 17 is operated saw 33 will be rotated and saw 33 may be moved toward the tree by horizontal swinging of beam 19 through movement of operating member 45. In the event the horizontal swinging of saw beam 19 is not sufficient for the saw 33 to cut through the tree, tractor 10 may be shifted to position saw 33 in another cutting position, and this shifting may be continued about the base of the tree until the tree has been completely cut through. The elevation of saw 33 may be regulated by raising or lowering of supporting members 14 so that the tree may be cut at the desired height from the ground.

The pivot bolt 20 extends through an opening 20a formed in beam 19, opening 20a being parallel with shaft 30. When bolt 20 extends through opening 20a saw 33 will be horizontal so as to make a horizontal cut. In order to position the saw vertical for forming a vertical cut, a second opening 20b is formed in beam 19 at right angles to opening 20a, beam 19 being turned to position opening 20b vertical for receiving bolt 20. When saw 33 is in a vertical position pulley 37 will be extended horizontally from power take-off 18.

What I claim is:

A saw attachment for a tractor having a drawbar and vertically swingable supporting arms for the drawbar, said attachment comprising an elongated beam engaging over said drawbar, a vertical pivot securing said beam to said drawbar between the ends of said beam, a transverse bar fixed between said arms and engaging over said beam forwardly of said pivot to hold the rear extended end of said beam against vertical rocking relative to said drawbar while permitting horizontal swinging of said beam, a vertical saw-carrying shaft at the rear of said beam, a bearing for said shaft carried by the rear of said beam, and an operative connection between said shaft and the tractor power take-off.

JAMES STEWART WEBB.

REFERENCES CITED

The following references are of record in the file of this patent:

UNITED STATES PATENTS

| Number | Name | Date |
|---|---|---|
| 1,210,305 | Hagerman | Dec. 26, 1916 |
| 1,318,324 | Keon | Oct. 7, 1919 |
| 1,798,402 | Dibble | Mar. 31, 1931 |
| 1,832,599 | Wilhelm et al. | Nov. 17, 1931 |
| 2,299,129 | Dickenson et al. | Oct. 20, 1942 |
| 2,350,880 | Dellinger et al. | June 6, 1944 |
| 2,365,408 | Hillyer | Dec. 19, 1944 |
| 2,400,595 | Okeson | May 21, 1946 |
| 2,404,655 | Randall | July 23, 1946 |

FOREIGN PATENTS

| Number | Country | Date |
|---|---|---|
| 632,508 | France | Oct. 10, 1927 |
| 118,382 | Australia | Apr. 11, 1944 |
| 118,817 | Australia | Aug. 14, 1944 |